T

US008032626B1

(12) United States Patent
Russell et al.

(10) Patent No.: US 8,032,626 B1
(45) Date of Patent: *Oct. 4, 2011

(54) METHOD AND SYSTEM FOR MONITORING THE PERFORMANCE OF A DISTRIBUTED APPLICATION

(75) Inventors: Ethan George Russell, Seattle, WA (US); Stephen William Cote, Snoqualmie, WA (US); Erkki Ville Juhani Aikas, Seattle, WA (US); Brian David Marsh, Seattle, WA (US); John Bradley Chen, Seattle, WA (US)

(73) Assignee: Symantec Corporation, Mountain View, CA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 11/863,027

(22) Filed: Sep. 27, 2007

Related U.S. Application Data

(63) Continuation of application No. 09/991,127, filed on Nov. 14, 2001, now Pat. No. 7,600,014.

(60) Provisional application No. 60/249,134, filed on Nov. 16, 2000.

(51) Int. Cl.
*G06F 15/16* (2006.01)
*G06F 15/177* (2006.01)
(52) U.S. Cl. .................. 709/224; 709/223; 715/736
(58) Field of Classification Search .................. 709/223, 709/224; 715/736
See application file for complete search history.

(56) References Cited

U.S. PATENT DOCUMENTS

| | | | | |
|---|---|---|---|---|
| 5,732,218 A | * | 3/1998 | Bland et al. | 709/224 |
| 5,796,952 A | * | 8/1998 | Davis et al. | 709/224 |
| 6,006,260 A | * | 12/1999 | Barrick et al. | 709/224 |
| 6,078,956 A | * | 6/2000 | Bryant et al. | 709/224 |
| 6,292,832 B1 | * | 9/2001 | Shah et al. | 709/226 |
| 6,411,998 B1 | * | 6/2002 | Bryant et al. | 709/224 |
| 6,446,028 B1 | * | 9/2002 | Wang | 702/186 |
| 2001/0010059 A1 | * | 7/2001 | Burman et al. | 709/224 |
| 2002/0010780 A1 | * | 1/2002 | Wong et al. | 709/226 |

OTHER PUBLICATIONS

Jia Wang, "A Survey of Web Caching Schemes for the Internet", Oct. 1999, ACM Computer Communication Review, 29(5): 36-46. Available at: http://citeseer.pst.edu/wang99survey.html.*
Ron Lee, Richard Lamplugh & Don Porter, "Charlotte: An Automated Tool for Measuring Internet Response Time", Jul. 1, 1998, available at: http://support.novell.com/techcenter/articles/ana19980704.html.*
Final Office Action received in U.S. Appl. No. 09/991,127; Aug. 8, 2007.

(Continued)

*Primary Examiner* — Aaron Strange
(74) *Attorney, Agent, or Firm* — Advantedge Law Group

(57) ABSTRACT

A service monitor and a browser monitor determine performance metrics on both a server and a client in connection with a distributed application running on a network. While applicable to other types of distributed application data, an example is described in which a Web page is requested by a user running a browser program on the client computer. In response, the server transmits the requested Web page, along with JavaScript code that defines a browser monitor, to the client. A browser monitoring function controlled by this code determines a plurality of different performance metrics related to the access of Web pages by the client. In addition, the server monitor determines performance metrics specific to its function in providing the Web page to the client. A correlated performance metric is determined by combining a server performance metric with a browser performance metric.

20 Claims, 8 Drawing Sheets

OTHER PUBLICATIONS

Non-Final Office Action received in U.S. Appl. No. 09/991,127; Dec. 28, 2007.

Wang, Jia; "A Survey of Web Caching Schemes for the Internet"; Cornell Network Research Group; Oct. 1999.

Non-Final Office Action received in U.S. Appl. No. 09/991,127; Nov. 10, 2008.

Advisory Action Received in U.S. Appl. No. 09/991,127; Aug. 12, 2008.

* cited by examiner

METHOD AND SYSTEM FOR MONITORING THE PERFORMANCE OF A DISTRIBUTED APPLICATION

RELATED APPLICATIONS

This application is a continuation of U.S. application Ser. No. 09/991,127, filed 14 Nov. 2001, which claims the benefit of U.S. Provisional Application No. 60/249,134, filed 16 Nov. 2000, the disclosures of each of which are incorporated, in their entirety, by this reference.

FIELD OF THE INVENTION

The present invention generally relates to the online monitoring of the performance of a computer system in regard to a distributed application, and more particularly, to monitoring of the performance of a distributed application using data determined at a recipient computing device that is accessing the distributed application data.

BACKGROUND OF THE INVENTION

A distributed application is a software system that runs on two or more computers connected by a computer network. Client-server computing is a special case of distributed application computing. With the growth of the World Wide Web (WWW), interactive distributed applications have become a substantial part of popular computer usage. Web services based on Hypertext Markup Language (HTML) and Hypertext Transfer Protocol (HTTP) represent one type of distributed application. Other kinds of distributed applications include instant messaging, streaming media, and automated teller machines used by banks. Electronic mail is an example of a noninteractive distributed application. Distributed applications are commonly implemented using the Internet, but can also be implemented using private wide area networks (intranets), virtual private networks (VPNs), or local area networks (LANs).

A significant problem for users and providers of network services can be the slow or poor performance of a distributed application. Software that enables the performance of distributed applications to be monitored is thus an important tool in addressing this problem. However, measuring the delivery via protocols such as HTTP of content over the Internet is complicated by the federated nature of the Internet (compared to LANs or intranets), because the overall performance of the system depends not only on infrastructure that is directly controlled by the application provider, but also by a multitude of third parties. These third parties include the providers of collocation and hosting services (e.g., Rackspace, Netinfra, Exodus, Digex), providers of Internet network connections (e.g., InterNAP, UUNet, and Cable & Wireless), multiple backbone providers (e.g., ATT, Sprint, MCI, UUNet, and Cable & Wireless), content delivery networks (e.g., Akamai, Mirror Image Internet, and Digital Island), advertising networks (e.g., Double-Click and Avenue-A), and consumer Internet service providers (ISPs) (e.g., AOL, Earthlink, MSN, and @Home). Problems in any of these third party providers can lead to distributed application service degradation or failure, but the number of providers involved and the limited visibility that an application provider generally has into these independently administered systems commonly makes service problems particularly difficult to detect and diagnose.

A critical aspect of addressing performance problems is measurement, so that problems can be detected quickly when they occur, and so that their specific domain of impact can be identified in support of problem diagnosis. For these measurements, application level metrics, which indicate the performance experienced by an application end user, are the most direct measure of successful application delivery. Secondary measures, such as network level and system level metrics, can be useful in diagnosis when a problem has been detected. Examples of network level metrics are network packet counts and link errors. Examples of system level metrics include central processing unit (CPU) and memory utilization. Although secondary metrics can be very informative, they do not enable an administrator to understand the level of service that the application end users have experienced.

In current practice, the distinction between application level metrics vs. secondary metrics is often blurred or confused. To provide an example of application level information, it is necessary to consider a specific distributed application, such as a book shopping application implemented on the Internet. In this example of a distributed application, relevant application specific Web pages might include a home page, a search page, numerous catalog pages, a shopping cart Web page, and a sequence of Web pages to implement a checkout process. Also, for this example, application level performance information might include an average response time, i.e., the average wait time experienced by an end user for a specific Web page such as the home page or the search page to be fully rendered in the user's browser program. In addition, other measures of application level performance will also be of interest to those managing the book shopping service.

Generally, the delivery system for a modem distributed application can be simplified if viewed as comprising three major components. The first of these components, the "first mile," commonly includes a multitier server farm or application server where the content of the distributed application is generated (or stored) and served. In the case of a Web-based distributed application, this first component might include HTTP servers, application servers, and database servers. In addition, the first component commonly includes load-spreading devices and firewalls. Also often included in the first component are private networks that provide interconnection of server-side systems and connect the server ensemble to the larger external network.

The third component, the "last mile," includes the end user's system (commonly a desktop computer running a browser program) and its connection to the inter-network. The domain between the first and third components comprises the second component, which includes the inter-network that enables clients to communicate with servers.

Although those responsible for maintaining a distributed application are generally concerned with the performance delivered to end users, they are typically severely restricted in doing so, because of the limited resources at their disposal for detecting and diagnosing the full range of performance problems that impact end users. Substantial information is readily available about the performance of the first component to those who directly administratively control and manage this level; yet, little or no information is available for systems that are administered by others in the second and third components. For systems comprising the first component, administrators having direct control can employ management frameworks and server monitors. Examples of such programs include NetIQ's AppManager™, BMC's Patrol™, Hewlett Packard's OpenView™, Quest's Spotlight on Web Servers™, and Topaz Prizm™ from Mercury Interactive. These management tools are effective for delivering system and network metrics, but they are generally not able to deliver application level metrics. As a result, the administrators of the distributed applications typically do not have adequate information to detect or diagnose performance problems experienced by end users, or other service problems experienced by end users, or to evaluate the health and performance of the inter-network through which the application servers are connected to the end users.

In spite of this lack of visibility and control, application administrators are still generally motivated to do what they can to monitor and improve an application's performance because of the significant impact that the performance has on their business. This need has fostered the development of a number of technologies (along with companies to deliver them) that provide approximate measures of application level metrics. The most common approach for Web sites involves using artificially generated traffic from "robots" at a small number (typically tens or hundreds) of locations that periodically request Web pages as a test of the performance of a Web site. Example of this technique include Keynote Perspective™ from Keynote Systems, ActiveWatch™ from Mercury Interactive, the Gomez Performance Network™ from Gomez Networks, as well as solutions by Appliant Inc. This type of performance monitoring system is sometimes referred to as "active monitoring." Active monitors enable periodic experiments in a relatively stable, controlled environment. Because the number of robots and the frequency of experiments is very small compared to the size of the end user population or the complexity of the Internet, active monitors at best provide an approximation of the performance experience of actual end users.

Another solution for obtaining application level metrics is possible in the case where the administrators of both the first component and the third component cooperate in implementing a monitoring system. A special case occurs when both the first component and third component are organized under the same administrator, as is commonly the case with a corporate intranet. In this case, the administrators have the option of installing software components in both the first and third components of the system. Example vendor solutions of this type include NetIQ's End2End™ and Mercury Interactive's Topaz Observer™. However, this solution is frequently inappropriate for the following reasons:

For Web browsing on the Internet, end users commonly prefer not to download and install desktop performance monitoring programs, due to security and privacy concerns. These concerns apply both to executable content, such as Active-X controls, as well as to Java applets. Yet, there is an important distinction between Java applets and JavaScript, since JavaScript is widely accepted/allowed by browser program security settings, while Java applets are not.

Even when the first and third components are in the same administrative domain, a solution with no desktop installation requirement is often preferred due to the complication of installing and maintaining an additional desktop monitoring component.

Accordingly, data collection techniques for determining the performance of a distributed application should preferably use a different approach that does not require the active cooperation of the end user. Specifically, it is important to develop a technique for collecting application level metrics from the end user's computing devices without requiring the active installation of software components by the end user. In this manner, collection of a broad set of application level performance metrics from the end user perspective can be accomplished in a manner that is transparent to the end user and without requiring the end user to participate in the software installation on the end user's computing device.

With respect to application level information, three specific metric collection techniques are relevant. Compound metrics are collected using a mechanism that maintains per-user state across multiple application requests. For example, the latency or interval of time required to react to an end-user request to navigate from a document A to a document B can be measured as the latency or interval between a time that a request to fetch document B was made while document A is being displayed until the time the HTML file corresponding to document B has been downloaded by the browser program. Measuring this fetch latency in a non-intrusive manner requires maintaining and associating state information collected in the context of both document A and document B. However, there is generally no provision (except a browser register) provided for maintaining state information between Web documents displayed by a browser program unless the state information is retained as a cookie. The prior art does not teach or suggest how to determine compound metrics. Correlated metrics are derived from measurements on both the client and the server. More specifically, they require the comparison of the server measurement and the client measurement for a specific end user request as a part of their computation. Event-based metrics indicate or characterize an event (such as an error) that occurred in responding to a request for a distributed application or in rendering an image.

Solutions exist that collect limited application level information. However, although these solutions deliver ample usage information, they fail to deliver the performance information that is required to support more effective detection and deeper diagnosis of distributed application service problems. An example of a prior art solution that exhibits this limitation is HitBoX™, which is available from WebSideStory (www.websidestory.com). HitBoX™ uses JavaScript annotations to HTML Web pages to collect page usage metrics, but does not determine or collect performance metrics. Another relevant offering is the WebTrendsLive™ service from NetIQ (www.webtrendslive.com). These software solutions are limited in that they cannot determine or collect compound metrics or correlated metrics. They are also limited in the scope of their event-based metric collection. Finally, they are unable to tolerate common error or environmental conditions, such as network partitions.

A system and method for monitoring a distributed application is disclosed in U.S. Pat. No. 5,958,010. In this prior art approach, each computer on a client-server network has a Mission Universal Monitor (MUM) agent installed on it that monitors the data being exchanged over the network. The MUM agents can be installed as software modules, hardware modules coupled to the backplane of each managed node, or as a combination of hardware and backplane elements. The MUM agent can collect data regarding business transactions, databases, systems, systems and networks, and events, and can report the information to a MUM console module for subsequent review. However, a MUM agent must be explicitly installed on each monitored computer or node and is not capable of being implemented without having administrative control over the entire network, or the cooperation of the end users in installing the agents.

U.S. Pat. No. 6,006,260 discloses a method and apparatus for evaluating service to a user over the Internet at the browser program level, which can be done without requiring that the user actively install the code to do browser monitoring. In this approach, a user requests a desired Web page from a Web server, for example, with a selection made by the user in a browser program. The Web server sends back the requested Web page, which contains code to execute a browser agent. Either the user selects a hyperlink in the returned Web page that is rendered in the browser program to download a test page, or the browser monitor automatically sends a request to the Web server to download the test page. In response, the Web server sends the test page back to the browser program, enabling the browser monitor to calculate a download interval for the test page. The download interval is encoded into a request for a third Web page that is directed to a relay server, which returns a blank Web page signifying that the download interval was received. The patent also discloses that other performance parameters can be determined by the browser agent, but does not provide any details about what those performance parameters are or how they are determined. Moreover, the invention disclosed by this prior art reference does not enable a correlated or compound performance metric to be determined for the distributed application, because it does not disclose determining a performance component for the Web server that might be combined with a performance parameter determined by the browser monitor. Furthermore, the prior art approach is deficient, because it is not transparent to (i.e., hidden from) the end user.

From the preceding discussion, it will be apparent that it is important to collect a broader range of application level metrics than is permitted by the prior art, including compound, correlated, and event-based metrics. In addition, the collection of application level information should be robust in the presence of common error and environmental conditions. The present invention addresses these problems and is specifically able to determine a correlated performance metric that includes performance information determined at each end of a distributed application data transfer.

SUMMARY OF THE INVENTION

In accord with the present invention, a method is defined for determining one or more performance metrics for a distributed application. In the method, distributed application data are transferred from a second site to a first site over a network in response to a request from the first site that is transmitted to the second site. As used herein the term "distributed application data" is simply a broader category that includes a Web page. Although the Description of the Preferred Embodiment that follows is primarily directed to determining performance metrics in regard to the transfer of a Web page from a server and its rendering on a client computer, it should be understood that the present invention is more generally intended to encompass the determination of performance metrics for any type of distributed application and for other types of computing devices. As explained below, the first site may include a client computer on which a browser program is running. A user of the client computer may request a specific Web page be downloaded from a server and displayed by the browser program. In response to the request, the distributed application data, e.g., the HTML instructions defining a Web page, are transferred from the second site to the first site over the network, if not already accessible in a cache at the first site. To avoid the need for the user to explicitly install a performance monitoring program, machine instructions that define a performance monitoring function are included with the distributed application data that were requested and both the machine instructions and the distributed application data are transmitted over the network to the first site. The machine instructions are then executed at the first site, automatically and transparently, to implement the performance monitoring function used to determine the one or more performance metrics for the distributed application. In addition, the performance of the second site is determined and combined with at least one performance metric determined at the first site, in the case of a correlated performance metric.

The performance monitoring function is preferably initiated when the distributed application data are accessed at the first site. The method also includes the step of collecting performance metrics for the distributed application over the network. Optionally, a probabilistic sampling parameter can be applied to determine whether performance metrics are collected from a plurality of sites at which the performance monitoring function is being implemented. This technique enables a sampling of the performance metrics, which can be applied on a per-session basis, or on a per-request basis to reduce the performance metric data that are processed.

In addition to the correlated performance of the network, the performance metrics that can be determined by the performance monitoring function include: (a) a fetch latency, corresponding to a time period required to fetch the distributed application data from the second site over the network; (b) a render latency, corresponding to a time period required to fetch and display all contents of the distributed application data at the first site; (c) a dwell latency, corresponding to a time period exhibited by a user requesting the distributed application data, before requesting other distributed application data; (d) a per-image fetch latency, corresponding to a time period for fetching a specific image referenced in the distributed application data; (e) an image arrival time, corresponding to a time at which a specific image, loaded as a part of accessing the distribution application data, arrives at the first site; (f) a navigation status, corresponding to an event that brought a user to the distributed application data; (g) a cache status, corresponding to a determination of whether the distributed application data was cached at the first site; (h) a window resize event, corresponding to a determination of whether the user resized a window in which the distributed application data is accessed; (i) a page stop event, corresponding to a determination of whether the user aborted an original request during loading of the distributed application data or loading of data referenced by it; (j) an image error event, corresponding to a determination of whether an error occurred while loading an image referenced in the distributed application data; and (k) an error event from a scripting language, such as JavaScript or VBScript, corresponding to a determination of whether an error occurred during interpretation of script included in the distributed application data. This list is not intended to be limiting, since, clearly many other performance metrics can be determined, both at the first site and at the second site.

Thus, there are a number of different kinds of performance metrics. Another option is therefore to enable a determination of whether to collect a performance metric as a function of the type or value of the performance metric that was determined.

Clearly, the latency for fetching a Web page that is cached will be substantially less than for a Web page that must be downloaded from a server. So, the method also preferably includes the step of determining whether the distributed application data are cached at the first site or must be transferred from the second site, which is not a trivial determination.

A key aspect of the present invention is that the performance metrics at the first and second sites be determined substantially without any apparent affect on the access of the distributed application data by the first site. For example, the determination of the performance metrics should not noticeably delay access of the distributed application data at the first site or provide any visual evidence to a user that the performance metrics are being determined. Because this requirement is an important feature in the present invention, it is not acceptable to require the loading of a browser monitoring agent before delivering a page that was requested by the end user (as is done in the prior art), since to do so would introduce an unacceptable performance delay that might well be apparent to the end user.

Another aspect of the present invention is directed to a medium on which machine instructions are stored that enable the performance metrics to be determined in the manner discussed above.

Still another aspect of the present invention is directed to a system that includes a first site and a second site. At each site, a computing device includes a memory, a network interface that enables communication over the network, and a processing device that is coupled to the memory, and the network interface. At the first site, the processing device causes a request for the distributed application data to be transmitted over the network through the network interface to the second site. The processing device at the second site responds by transmitting the distributed application data along with machine instructions that cause the processing device at the first site to perform a performance monitoring function. The processing device at the first site can also perform a performance monitoring function, the results of which can be correlated with the information collected at the second site. Thus, the elements at both sites perform functions generally as described above in connection with the method of the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview

Figure 1:
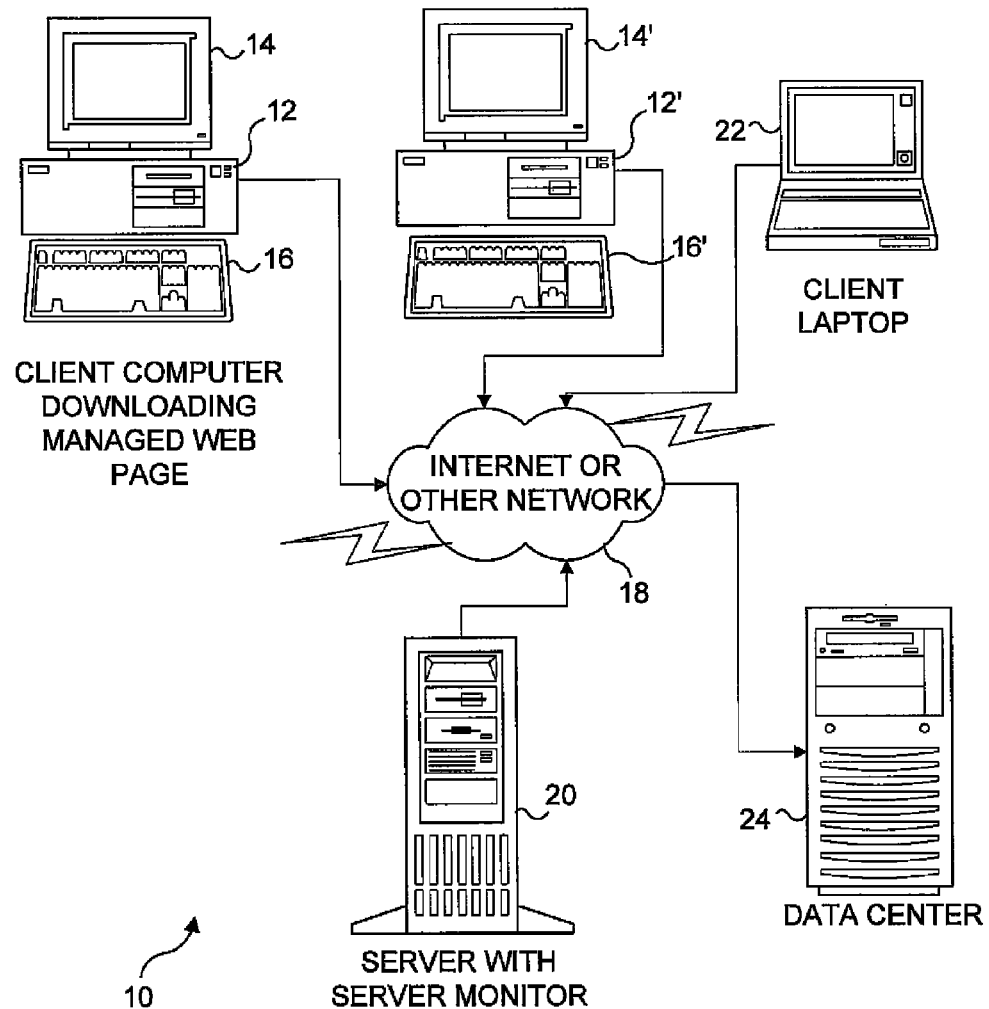
FIG. 1 is a schematic diagram showing exemplary client computers coupled in a network with a server computer and with a data center at which performance metrics are selectively collected and processed.

The present invention is employed for monitoring performance, usage, and availability metrics for a distributed application. As a special case discussed below, the present invention supports measurement of performance metrics for distributed applications based on HTML (i.e., a Web page) delivered using HTTP as the application level transport protocol. Examples of points at which such monitoring of performance may occur include Web servers, Web browser programs, and caching proxies located on a path between the servers that supply the content and a client access device that receives the content.

The measurement system of the present invention preferably includes two types of monitoring elements. The first type is a server monitor that resides on a server responsible for the creation of content. Alternatively, the server monitor function occurs in a Web caching proxy. In another alternative, both a server monitor and a Web caching proxy monitor may be used. In general, the system benefits from monitors on each of the devices of the network that impact the end-user experience, with each monitor revealing a contribution of the device on which it is active, to the overall performance experienced by the end user. The second type is a browser monitor that is implemented using a program delivered transparently to the end user with a monitored Web page or other type of distributed application data. However, it may not be necessary for a Web browser program to load the browser monitor if there is an up-to-date copy of the program in a cache accessible by the browser program. In other situations, the browser monitor is embedded directly in the managed Web page. Both performance monitors preferably deliver the performance data that they collect to a central collection and reporting point or data center, for data analysis and generation of related reports. Additional performance monitors can optionally be included to provide management data from other intermediate perspectives in the system.

Although the transfer of data from the performance monitors to the data center is commonly implemented using HTTP transport in the preferred embodiment, other transport protocols or systems can be used. The browser monitor enables the present invention to monitor Web browsing from the client perspective, while avoiding the significant logistic and administrative burden of requiring an end user to affirmatively install a piece of software on the client network access device.

Deployment of the server monitor and the data center is relatively straightforward, because in both cases, the systems on which the software is installed to implement performance monitoring are under the direct administrative control of parties actively and cooperatively engaged in monitoring the performance of the distributed application. By contrast, the browser monitor preferably operates in the very restricted environment of the end user's Web browser program, where no additional software can be installed in a conventional manner, without the direct cooperation and affirmative assistance and agreement of the end user. To avoid the need to solicit the cooperation of the end user, all performance monitoring functionality in this portion of the present invention is typically delivered with a Web page requested by the end user. Furthermore, the browser monitor functions in a fashion that does not significantly affect the client network access device, does not require specific additional action on the part of the end user, and does not adversely affect the delivery process it is designed to measure.

To avoid the requirement that the client's network access device have a piece of software installed by the end user, the present invention preferably implements the browser monitor element as annotations appended to the HTML content being delivered. Specifically, the browser monitor element uses standard or quasi-standard Internet systems and protocols for implementing metric collection, and to deliver performance metric data to the data center over the Internet. The three preferred public standards and protocols employed by the present invention are HTML, HTTP, and JavaScript.

The browser monitor element makes significant use of "cookies" to store information about management events; and the server includes a special cookie with a managed Web page to indicate that the Web page is a managed document for which performance metrics should be determined by the browser monitor. Cookies are used to maintain state between consecutive managed end user requests, which is fundamental to the implementation of compound metric collection in a preferred embodiment of the present invention. The need to use a mechanism such as cookies to maintain state arises from the restricted JavaScript execution environment. In this environment, persistent state cannot be saved to the hard disk or to the Windows Registry, as is common practice for implementing persistent storage of state in less restricted software execution environments. Alternatively, however, state can be stored and maintained in an auxiliary browser window or frame, or in a "userData" data storage facility provided by some versions of Microsoft Corporation's INTERNET EXPLORER™ Web browser program.

A concept central to the present invention is the use of Web page instrumentation in the form of HTML and JavaScript annotations that function to detect key performance events. Another important concept employed in the present invention is the use of standard protocols, such as HTTP requests over Transmission Control Protocol/Internet Protocol (TCP/IP) to deliver management information, i.e., the performance data thus determined, back to the central collection point at the data center.

The browser monitor is able to monitor and report on the client end user experience in a way that is transparent to the client end users and to scale up to a very large number of monitored client end users. Additionally, it collects a substantial breadth of performance metrics using HTML page annotations and is robust in managing and delivering those performance metrics to the data center.

Table 1 (below) shows the unique metrics that can be determined by the browser monitor. There are several classes of performance metrics that are determined by the present invention, including those that are measured directly. The present invention also generates derived metrics using correlated browser monitor/server monitor data and can calculate additional metrics using the correlated browser monitor/server monitor data. Several performance metrics include some measure of latency. As used herein, the term "latency" generally indicates a length of time, such as 2.03 seconds, whereas the term "time" generally indicates a point in time, such as 11:15 AM on a specific date.

TABLE 1

Browser Monitor Performance Metrics and Events

Performance Metrics

| | |
|---|---|
| Fetch latency | Latency to fetch the base HTML document from the server. |
| Render latency | Latency to fetch and display the complete contents referenced within the HTML document, including images, etc. |
| Dwell latency | The latency exhibited by an end user in displaying a Web page, before navigating to a different page. |

TABLE 1-continued

Browser Monitor Performance Metrics and Events

| | |
|---|---|
| Per-image fetch latency | Latency for fetching a specific image, commonly in the context of loading an HTML page. |
| Image arrival time | Time at which a specific image, loaded as a part of rendering an HTML document, arrives on the browser, which may be recorded as an absolute time or as a time relative to the start of rendering the HTML document. |
| Network latency | Difference between fetch latency and server latency, which is measured by the server monitor. |

Events

| | |
|---|---|
| Navigation status event | Event that brought user to this page (following link, submitting form, refresh button, back button, forward button, typing URL/bookmark). |
| Cache status event | Was this page cached, & if so, by the browser or by a proxy? |
| Page stop event | Did the end user employ the "stop" button or other mechanism to abort loading of the HTML document? |
| Image error events | Did errors occur while loading images used by the page? |
| JavaScript error event | Did errors occur during interpretation of the JavaScript included in the page? |

Since the browser monitor runs in a browser program of the client, it can determine and take into account many variations of environmental information. Some of this functionality in a preferred embodiment of the present invention differs substantially from the known prior art monitoring software programs. For example, the HitBOX™ system from WEB SIDE STORY™ (http://www.websidestory.com) uses a different set of annotations to track a relatively smaller set of usage data, including usage counts for pages, as well as a variety of environmental information—but does not determine performance metrics.

The following metrics and events, among others, provide data in regard to page information and redirection, which is not done in the prior art:

Fetch Latency
Render Latency
Dwell Latency
Per-image Fetch Latency
Image Arrival Time
Network Delay
Navigation Status
Cache Status
Window Resize Event
Page Stop Event
Image Error Event
JavaScript Error Event The following metrics contain environmental information regarding client information that the browser monitor can also report (at least some of which may be collectible by technologies used in the prior art):

Internet Protocol Address
Operating System
Browser Type and Version
Screen Resolution and Color Depth
JavaScript Enablement and version
Language Metrics.

Also provided by the browser monitor with respect to Web page information are:

Referring Web Page
Number of Images on Web Page
Number of Unique Images on Web Page
Number of Links Number of Forms
Number of Frames
Number of Java Applets
Number of Plug-ins
Modification Date Metrics The browser monitor JavaScript code can be stored in the data center or on the server supplying a Web page requested by the client end user, both of which are accessible by browser programs that are connected to the Internet. The JavaScript can be appended to the Web page received by the client, or if collecting a somewhat different set of performance metrics, it will be necessary for the annotation to occur toward the beginning of the HTML document. To ensure that the browser program receives and executes the browser monitor functionality, managed HTML documents must either include the browser monitor code, e.g., as appended code, or must include an appropriate HTML statement that references the browser monitor code, such as:

<script language="JavaScript"
src="http://code.sea.data center.com/browsermonitor.js">
</script>

The above example shows that the file "browsermonitor.js" is loaded from the Web site named by code.sea.datacenter.com. Alternatively, the code can be loaded from a different HTTP server not at the data center. In some situations, it can be served by the same domain as that which provided the HTML document. In other cases, it can be provided by a content delivery network. Using the language of the HTML 4.01 specification (accessible at http://www.w3.org/TR/1999/REC-html401-19991224), an HTML script element is provided with an src attribute that refers to the browser monitor JavaScript code.

The above script element causes an HTML browser program to load the browser monitor JavaScript code, which is contained in the document named by the URL, and interprets the JavaScript code contained therein. In one embodiment of the present invention, the code is relatively small and will likely be cached by the client's browser program after the first reference, for use in subsequent references. Performance data determined by the browser monitor can be transferred after each request by a user for a different Web page, or can be batched and transferred to the server or data center less frequently to reduce network traffic. The HTML statement to load the browser monitor code can be inserted statically, as a part of the content authoring process, by manually inserting the tag into the HTML source for the Web page or into a script or template used to generate the Web page. Alternatively, the tag may be inserted dynamically by using a Web server plug-in, which adds an annotation to each Web page as it is delivered by the Web server to a client end user in response to a request received from the client end user's browser program. Yet another option is to use an HTTP proxy to insert the annotation.

Figure 3:
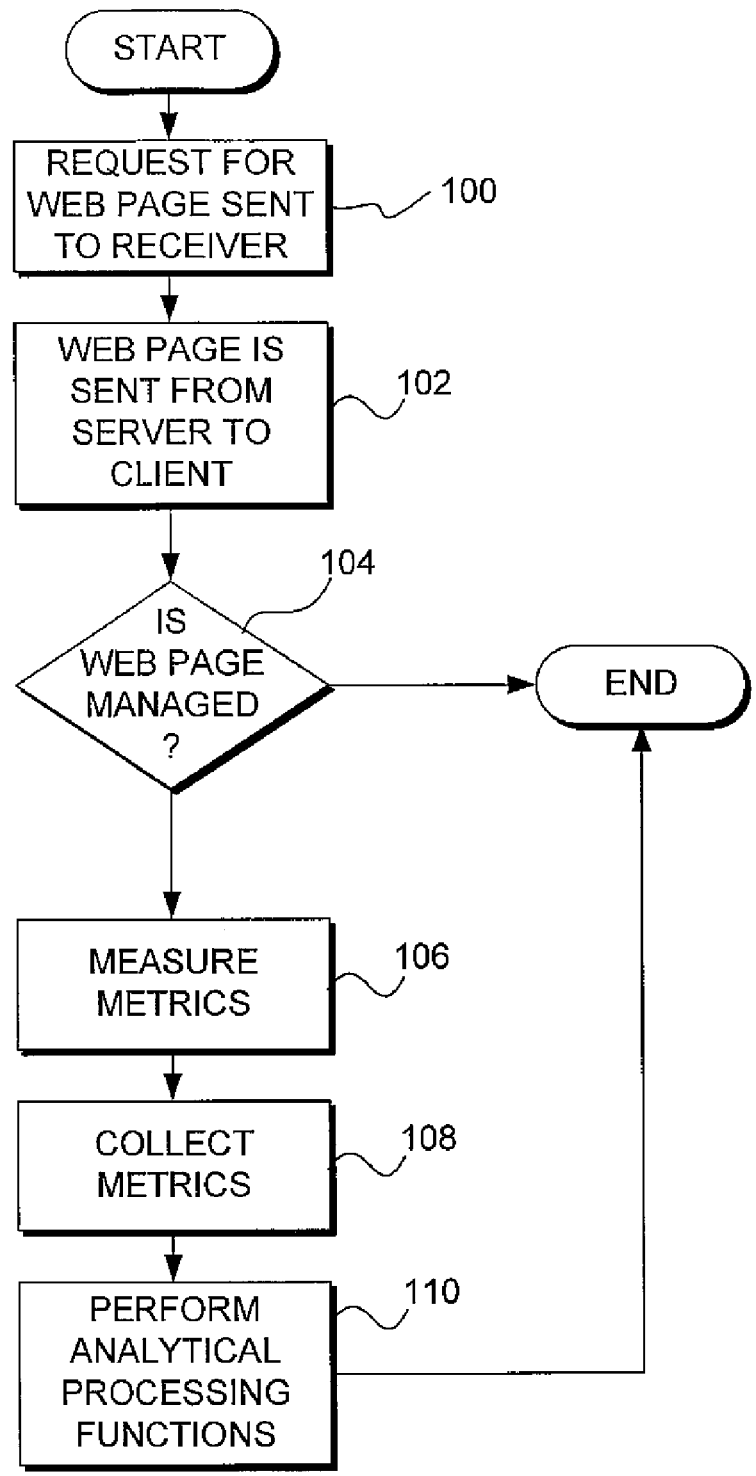
FIG. 3 is a block diagram illustrating the logical steps of a method for monitoring the performance of a distributed application, in accord with the present invention.

The following text describes the operation of various components of the present invention during the course of an HTTP request for one preferred embodiment. This description highlights the various components that participate in management of the request, and the function of each of the components, with reference to the flow chart of FIG. 3, and the timing and sequence of events implemented by the server and browser program shown below in Table 2. As shown in a step 100 of FIG. 3, a client end user requests navigation to a new Uniform Resource Locator (URL), for example, by sending a request to an application. This step may be done by activating a hyperlink or by typing a URL into an address window of a Web browser program running on the client end user's computer or other network access device. The Web browser program identifies the host name within the URL, establishes a TCP/IP connection to the host, and then uses the HTTP to request the document named by the URL from the named host, i.e., from a Web server, over the network.

The request is received by the Web server on which server monitoring software that operates in accord with the present invention is installed, and which is configured to manage the requested Web page. The server monitor detects the request for the Web page and compares the URL for that Web page to the managed URLs for the system to determine whether the Web page is managed. If the document named by the URL is managed, the server monitor does bookkeeping as required to record performance statistics for the page. The server monitor notes that a page request has occurred and records a timestamp to indicate when the server monitor first became aware of the page request.

As a part of delivering the named document to the client end user, the server monitor creates a "server monitor Cookie" (SM-Cookie). The server monitor cookie preferably contains at least a correlation GUID (a globally unique identifier containing a server ID and a timestamp), as well as additional configuration information that may be used by the browser monitor to support collection of specific performance metrics. In the process of serving the Web page, the server monitor records various performance metrics, including but not limited to, the latency on the server for responding to the corresponding HTTP request. The server monitor cookie can be used to transfer information between the managed Web server and the browser monitor JavaScript code that will be loaded by the Web browser program from the Web page received from the Web server (or from a cache accessible by the client browser program). Alternatively, this information can be written directly into the HTML document, for example, as defined between <script> tags.

Upon receiving the managed Web page in a step 102, the client browser program parses and processes the HTML document. As a part of loading and rendering the content of this Web page, the browser monitor JavaScript code is loaded and interpreted. The browser monitor checks for the presence of a server monitor cookie, in a step 104. If the server monitor cookie is set, the browser monitor recognizes that this Web page being loaded is a managed Web page and in response to this determination, records various state information and determines the performance metrics for the page in a step 106. The state information includes a timestamp and causes JavaScript event handlers (e.g., .onstop, .ontimeout, .onload, .onerror, .onabort, .onbeforeunload, .onclick, and .onsubmit) to be registered so that the browser monitor will respond to specific relevant events occurring in regard to the browser program. The browser monitor then returns control to the browser program, enabling rendering of the HTML document to continue with no visible effect observed by the client end user. Since the time required for this browser monitor activity to occur is relatively short compared to the time required to display the HTML document, the overhead of the browser monitor is not noticeable to the client end user.

TABLE 2

Sequence Of Events

| TIME | EVENT | ON BROWSER | ON SERVER |
|---|---|---|---|
| t0 | End user: request | End user requests HTML document using an HTTP request. Browser unloads managed document A. An unload event handler causes the monitor to record a timestamp "FetchStart" which indicates the initiation of a new end-user request. | |
| t1 | Server: receipt of end user request | | Server receives HTTP request. Server monitor detects request and recognizes that requested page is managed. It records a timestamp "ServerLatencyStart" |
| t2 | Server: begin response to end user request | | Server prepares SM-Cookie. Server transfer first packet of response to HTTP request As per the HTTP protocol server monitor cookie is included early in transfer. |
| t3 | Browser: Receipt of beginning of server response | Browser receives first packet of response to HTTP request for HTML document. As additional packets are received, browser parses HTML and initiates loading of document components such as images. Assuming this page is managed, the Browser monitor is loaded as one of these components. Fetchstop is recorded immediately prior to the loading of the browser monitor. | |
| t4 | Server: Completion of response | | Server transfers last packet of response to HTTP request. Server computes ServerLatency as (Current Time—ServerLatencyStart). |
| t5 | Browser: Receipt of end of server response | Browser receives last packet of response to HTTP request for HTML document. Typically this last packet will include the HTML annotation that causes the Browser monitor to be loaded | |
| t6 | Browser: browser monitor is loaded | Browser monitor is loaded by browser | |
| t7 | Browser: browser monitor is invoked | Browser monitor is activated and recognizes that HTML document is managed. Browser records end of fetch/start of render. Later, FetchLatency can be computed as t3-t0, provided that the previously document was managed such that FetchStart was recorded at time t0. | |
| t8 | Browser: onload JavaScript event | Browser records end of render/start of dwell. (Special case: if page rendering is terminated before the page is fully rendered, this condition is detected and used to delimit render time measurement.) At this time the Browser monitor computes FetchLatency (t7-t0), RenderLatency (t8-t7), and other metrics. These metrics are transferred asynchronously to the central data management facility. Dwell Time from the previous transaction will also be transferred at this time if the previous transaction was managed. | |
| t9 | Browser: on unload or other events | Browser will record end of dwell for any of the following conditions: (1) unload event (2) a new URL request A timestamp is recorded to support computation of fetch latency in the case that the next page is managed. As at t0, DwellLatency and FetchStart are recorded for use if the following page is managed by the Browser monitor. | |

Finally, the browser monitor JavaScript program causes the performance metrics to be collected in a step 108, which involves transmitting the performance metrics back to the server and/or to the data center. Analytical functions are performed on the measured metrics in a step 110, preferably at the data center (or at the server). Alternatively, additional requests may be transmitted to the application. In such a case, a measured performance metric may be transferred from one request to another. This measured performance metric determined in connection with one request for a Web page may be transferred to the server with a succeeding request for another Web page. Also, for compound performance metrics, the state from one request is transferred to the next request to enable a performance metric that relates to events occurring across multiple Web pages to be determined. Fetch latency, which is determined as shown above in Table 2 (and also below) is an example of this type of performance metric which requires the preservation of state information extending from a time occurring when one managed Web page is displayed by the browser program until a time when another Web page is displayed by the browser program. The present invention preferably uses a cookie to retain the state information determined in a first managed document that would otherwise be lost once the first managed document is erased to display a second managed document. The preservation of state information (such as time t0 in Table 2) across multiple managed documents is thus an important feature in determining compound performance metrics in the present invention.

Exemplary System for Implementing Present Invention

As shown in FIG. 1, an exemplary system 10 on which the present invention can be implemented includes at least one computer that receives the distributed application data from a source. More specifically, in this greatly simplified illustration, a processor chassis 12, an optional monitor 14, and a keyboard 16 comprise one client computer that employs a browser program to transmit a request for downloading a managed Web page over Internet 18 (or other network) to a server 20. Server 20 executes a server performance monitoring function in connection with responding to requests to download managed Web pages to client computers. Other client computers typically will include a similar processor chassis 12', a similar monitor 14', and a similar keyboard 16', or as shown, may be configured differently, such as a client laptop computer 22. The Web page or other distributed application data transferred to a requesting client computer over the network includes the JavaScript code or a reference for accessing the code that is used for implementing the browser monitor. The browser monitoring function performed within the browser program running on that client computer typically determines a plurality of performance metrics. The resulting performance metric data can be separately transferred over the network, or transferred as a batch to a request for another Web page and transmitted over the network. Server 20 can collect and process the performance metric data itself, or preferably, the performance metric data will be collected and processed by another computer 24 that is disposed remotely at the data center. The performance metric data that are collected can then be employed to produce reports and charts showing the condition of a distributed application for use by those managing the distributed application.

Since the data center can quickly become overloaded with incoming performance metric data being transferred to it by a multitude of servers and client computers, it is contemplated that the data center may optionally apply a probability function in selectively accepting the performance data to reduce the load on it. Alternatively, the server monitor and the browser monitor can apply the probability function in determining whether to collect and transfer performance metrics to the data center. The browser monitor and other monitors may include logic by which they delay or abort data transfers based on information obtained locally. For example, these performance monitors can recognize that a communication failure has occurred when attempting to communicate the performance metric to another site, such as the central data collection facility, and as a result, defer or omit a data transfer. In this way, the performance monitors avoid provoking load-induced failure on the central data collection facility. Also, the probability function can be applied on either a per-session or on a per-request basis, so that only a desired percentage of the total performance data being determined is actually received and processed by the data center. As a further alternative, the managers of a distributed application may selectively determine that only one or more specific performance metrics should be collected and received for processing at the data center, so that only those performance metrics that are of primary concern are processed. This filtering approach also will reduce the processing load of performance metric data by the data center.

Figure 2:
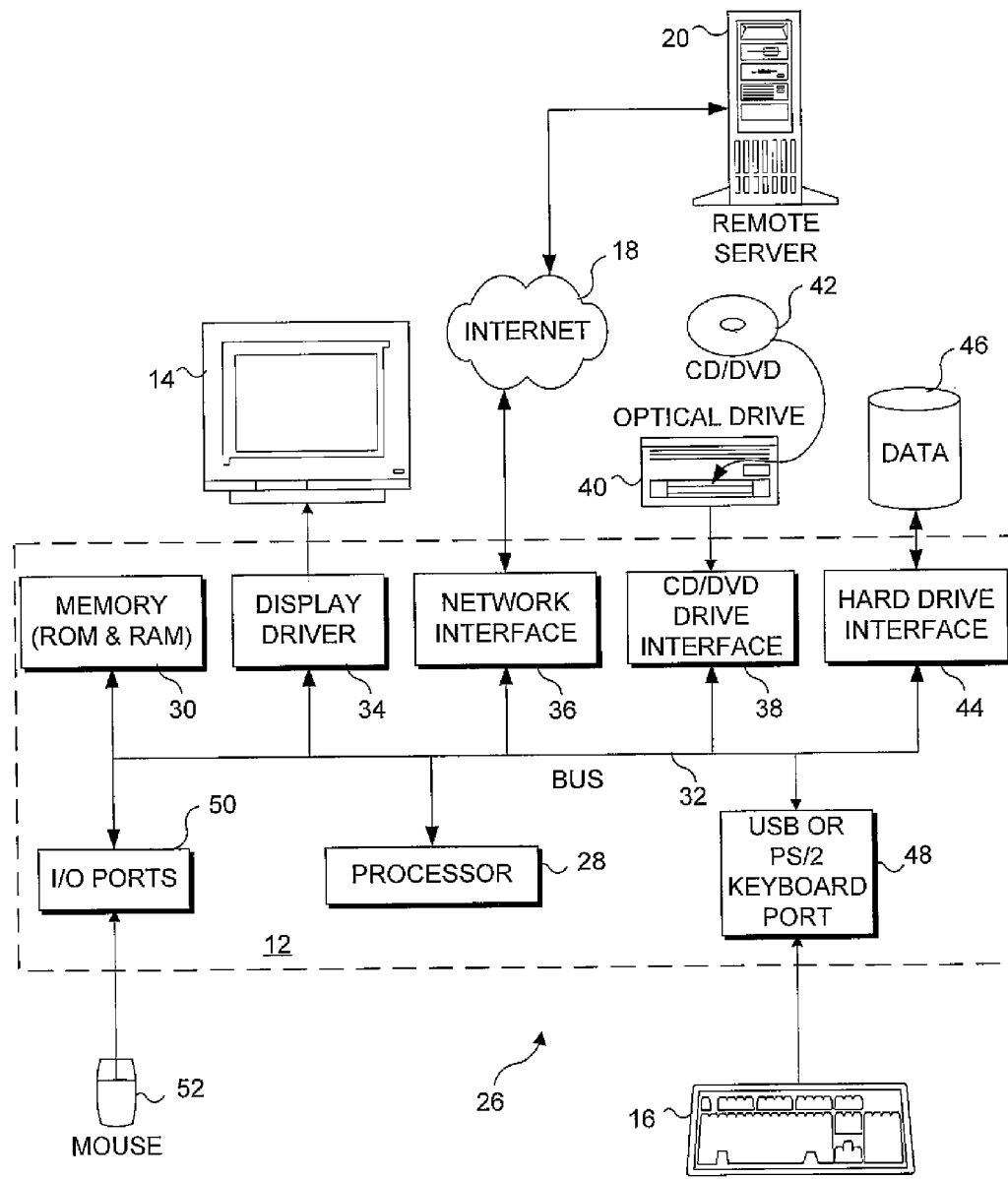
FIG. 2 is a schematic block diagram illustrating the components of a generally conventional personal computer suitable as either a recipient of monitored distribution application data (e.g., a monitored Web page) or as a source of the monitored application data, in connection with implementing the present invention.

FIG. 2 illustrates an exemplary computer 26 and some of the functional components that are included therein for use in implementing the present invention. This figure applies both to a computing device used for receiving a monitored HTML Web page or other type of distributed application data, and to a computing device that is the source of the Web page or distributed application data (e.g., server 20). It should also be noted that computer 24 at the data center includes components substantially identical to those that are included in computer 26, for carrying out the collection and processing functions.

Computer 26 comprises a processor chassis 12 in which a processor 28 is connected to a data bus 32. Also connected to data bus 32 is a memory 30, including both read only memory (ROM) and random access memory (RAM). Memory 30 temporarily stores machine instructions that, when executed by processor 28, cause it to carry out the performance monitoring functions described herein, and other functions. Once these machine instructions are received by the client computer, the machine instructions are typically stored along with other data on a hard drive 46, which is connected to data bus 32 through a hard drive interface 44 and are loaded into memory 30 from the hard drive. Similarly, machine instructions that define the server performance monitoring functions as described herein and other functions that it performs are also stored on its corresponding hard drive.

Also optionally connected to data bus 32 is a display driver 34 that provides a video signal used to drive monitor 14 on which text and images are rendered and displayed under the control of processor 28. In most cases, a monitored Web page is rendered and displayed on the monitor, and the performance of the browser program in fetching the Web page and displaying the images referenced therein is one of the types of performance metrics that is determined by the present invention. A network interface 36 is connected to bus 32 and provides access to the Internet (or another network). The client computer employs the network interface to connect over the network to a corresponding network interface of server 20 on which Web pages and data files are stored for access by the browser program running on personal computer 26 or by other software requiring access of the files stored on or accessible through server 20. The network interface may comprise a conventional modem, an Integrated Services Digital Network (ISDN) interface, or a network interface card or other device that provides access to the Internet. For example, the personal computer may connect to the Internet through a digital subscriber line (DSL) interface or through a cable modem. A Compact Disc/Digital Video Disc (CD/DVD) drive interface 38 provides access to data stored on a CD 42 (or a DVD disk or other optical storage medium), which is read by an optical drive 40 connected to the CD/DVD drive interface. Also coupled to data bus 32 are Input/Output (I/O) ports 50, one of which may be connected to a mouse 52 (or other pointing device), and a PS/2 keyboard port or a universal serial bus (USB) port 48, to which keyboard 16 is typically connected for input of text and commands by the user. It is also contemplated that if a computing device is employed that does not have a keyboard, an alternative input (or no input device) may be included. For example, the present invention might be used with a touch screen input device or in a system in which voice recognition is a preferred means for input and control of the system. Similarly, instead of a monitor for display, data may be provided aurally.

If network access devices other than a personal computer are used, they will typically include at least a processor, a memory, non-volatile memory for storage of machine instructions and data, some form of input/output, and appropriate interfaces thereto, or alternatively, one or more integral circuits in which these functional components are implemented. In addition, most network interface devices will include a network interface, and/or a wireless network connection.

Exemplary Functions Performed by Browser Monitor

Examples of the actions of the browser monitoring code executed on the client computer are shown below.

```
/* This function determines whether the current Web page is managed.
*/
   function IsUserSessionManaged(StateCookie)
   {
   SessionExpirationTimestamp =
       StateCookie.GetValue(SessionExpirationTimestamp);
   if (SessionExpirationTimestamp >= CurrentTime)
   {
       return StateCookie.GetValue(bSessionIsManaged);
   }
   SessionProbabilityToManage =
       StateCookie.GetValue(SessionProbability);
   If (rand( ) < SessionProbabilityToManage)
       bSessionIsManaged = true;
       else
       bSessionIsManaged = false;
       StateCookie.SetValue(bSessionIsManaged);
       return bSessionIsManaged;
   }
   /* This function sets all the required JavaScript event handlers */
   Function SetJavascriptEventHandlers( )
   {
       for each link in document
       link.onclick = DatacenterLinkOnClick;
       for each form in document
       form.onsubmit = DatacenterFormOnSubmit;
       for each image in document
           image.onerror( ) = DatacenterImageOnError;
           image.onabort( ) = DatacenterImageOnAbort;
       window.onerror( ) = DatacenterWindowOnError;
   window.onload( ) = DatacenterWindowOnLoad;
   window.onbeforeunload( ) = DatacenterWindowOnBeforeUnload;
   }
   Function BrowserMonitorMain( ) {
   StateCookie = CurrentCookies.GetNamedCookie(StateCookie);
   if (StateCookie.GetValue(bUserSessionManaged) == false)
       SetJavaScriptEventHandlers( );
       EXIT;
   PrevTransactionData = StateCookie.GetValue(PrevTransactionData);
   if (PrevTransactionData)
       TransferData(PrevTransactionData);
   TimestampT0 = StateCookie.GetValue(T0);
```

-continued

```
   MetricFetchTime = TimestampT1 - TimestampT0;
   MetricHttpMethod = StateCookie.GetValue(NextHttpMethod);
   MetricNavigationRoute =
DeterminePageNavigationRoute(StateCookie);
   MetricPageCachedByBrowser =
       DeterminePageCachedness(StateCookie);
   SetJavaScriptEventHandlers( );
}
/* window.onload event handler marks a timestamp when the page is
loaded. This step is used to calculate MetricRenderLatency. Also
counts the number of unique images for MetricUniqueObjectCount.
Gather page info at window.onload time because it may change as the
page is parsed and rendered. */
Function DatacenterWindowOnLoad( )
{
   TimestampT2 = CurrentTime;
   MetricRenderTime = TimestampT2 - Timestamp T1;
   MetricTotalObjectCount = 0;
   MetricUniqueObjectCount = 0;
   ImageURLs = new Associative Array (JavaScript object) for each image
in
document
   {
       MetricTotalObjectCount++;
       if (ImageURLs[image.src] !=1)
       {
           // this image not yet displayed
           ImageURLs[image.src] = 1;
           MetricUniqueImageCount++;
       }
   }
}
/* window.onerror event handler notes when a JavaScript error occurs
anywhere in the Web page whether it's in browser monitor code or not.
*/
Function DatacenterWindowOnError(ErrorMsg, ErrorUrl, ErrorLine)
{
   ErrorData = ErrorMsg + ErrorURL + ErrorLine + BrowserMonitorVersion
       + BrowserMonitorTagVersion + server monitorCookieValues;
   errorTransferUrl = location.protocol (http/https) + destination +
       /BrowserMonitor? + errorInfo;
   img = new Image;
   img.src = errorTransferUrl; (This step makes an HTTP request
to the destination)
}
/* image.onerror handler notes in MetricImageError that an image error
occurred */
Function DatacenterImageOnError( )
{
   MetricImageError = true;
}
/* image.onabort handler notes in MetricImageAbort that an image load
was aborted */
Function DatacenterImageOnAbort( )
{
   MetricImageAbort = true;
}
/* form.onsubmit handler notes NextHttpMethod, which will be
MetricHttpMethod for next page */
Function DatacenterFormOnSubmit( )
{
   NextHttpMethod = POST;
   SavePageInfo( );
}
/* form.onsubmit handler notes NextHttpMethod, which will be
MetricHttpMethod for next page */
Function DatacenterLinkOnClick( )
{
   NextHttpMethod = GET;
   SavePageInfo( );
}
/* This function calculates MetricDwellLatency, saves the current
metrics and state in the StateCookie, and lets the page unload */
Function SavePageInfo( )
{
   NextPageTimestampT0 = CurrentTime;
   if (TimestampT2 is not set)
       MetricUserInterrupt = true;
   else
   {
```

-continued

```
    MetricUserInterrupt = false;
    MetricDwellLatency = NextPageTimestampT0 - TimestampT2;
}
// Note that in this embodiment no data is transferred until DwellLatency
// has been computed, and the entire data transfer is deferred until the
// next managed page request. In an alternative embodiment, all
    metrics
// except DwellLatency are transferred earlier, during execution by the
    handler for
// the onload event.
TransactionData = Data and metrics about this transaction (company ID,
    full URL, correlator GUID (server ID, Timestamp),
    MetricHttpMethod, MetricFetchLatency, MetricRenderLatency,
    MetricDwellLatency, MetricUserInterrupt, MetricTotalObjectCount,
    MetricUniqueObjectCount, MetricImageError, MetricImageAbort,
    MetricNavigationRoute, MetricPageCachedByBrowser). Cannot
    transfer this data now because transfer might not complete before
    Web page is unloaded.
// Save the transaction data
StateCookie.SetValue(TransactionData);
// Save other info about this Web page
StateCookie.SetValue(location = URL of current location);
StateCookie.SetValue(referrer = URL that referred to this Web page);
StateCookie.SetValue(CorrelatorGUID = server
monitorCookie.CorrelatorGUID);
// Save backoff info
StateCookie.SetValue(BackingOff);
StateCookie.SetValue(NumTimesToBackOff);
StateCookie.SetValue(MaxBackoffsThisCycle);
StateCookie.SetValue(bUserSessionManaged);
    // EXIT, allowing page to unload; restart at step 2.
}
/* This function transfers data to the data center or other destination
where the data will be collected and processed. If the transfer takes
longer than dataTransferThreshold, it will uses an exponential backoff
algorithm that skips data transfers to reduce load on the destination.
The first transfer that exceeds the threshold will result in the next
transfer being skipped. After that skip, the second transfer is timed; if it
is completed in less than the threshold, then the max backoff will be set
to one again. If it fails, the next two transfers will be skipped, and so on.
*/
Function TransferData(destination)
{
    if (NumTimesToBackOff > 0)
    {
        NumTimesToBackOff -= 1;
        BackingOff = true;
        return;
    }
    dataTransferUrl = http:// + destination + /BrowserMonitor? +
        PreviousTxnDataValues
    img = new Image;
    set handerIs img.onerror( ) = img.onabort( ) = img.onload( ) =
timer( );
    /* Now transfer data by acting like an off-screen image is being
    requested, causing a request to the data center. This image does not
    actually appear in the HTML document in the way that results produced
    by the prior art HITBOX ™ or WEBTRENDSLIVE ™ programs do. The
    substantial advantages of the present invention are: (1) there is no
    chance of shifting the HTML content within the document as there is
    with a 1×1 gif that appears in the HTML; and, (2) no dummy content
    needs to be transferred to make up a response. */
    img.src = dataTransferUrl;
    if (timer( ) > server monitorCookie.GetValue(dataTransferThreshold))
    {
        if (BackingOff)
        {
            MaxBackoffsThisCycle = min (server
monitorCookie.GetValue(maxBackoffsAllowed),
                max(2 *
                    MaxBackoffsThisCycle, 1));
        }
        else
        {
            MaxBackoffsThisCycle = 1;
        }
        NumTimesToBackOff = MaxBackoffsThisCycle;
    }
    BackingOff = false;
}
```

```
/* This function makes a best guess about navigation routes */
Function DeterminePageNavigationRoute(StateCookie)
{
    if (StateCookie.LinkWasClicked)
    {
        if (referrer == StateCookie.location)
            return LINK_CLICK;
        else
            return UNKNOWN;
    }
    else if (historySize == StateCookie.historySize &&
        location == StateCookie.location &&
        referrer == StateCookie.referrer)
        return RELOAD;
    else if (location == StateCookie.referrer)
        return BACK_BUTTON;
    else if (referrer == StateCookie.location)
        return FORWARD_BUTTON;
}
/* This function determines whether this Web page was cached by the
browser program. If it was cached, the same cookie is obtained as
before, because the server did not need to provide a new one. */
Function DeterminePageCachedness(StateCookie)
{
    if (StateCookie.CorrelatorGUID == CorrelatorGUID)
        return CACHED_BY_BROWSER;
    else
        return NOT_CACHED_BY_BROWSER;
}
```

An example of the functions performed by the data center in accord with the present invention is as follows:

```
/* The data center receives data transferred from the
    browser monitor JavaScript in the browser program */
Function  RecordBrowserMonitorDataTransfer(Transac-
    tionData)
{
If   (TransactionData.GetValue(MetricPageCachedBy-
    Browser)==false
    &&
    IsCorrelatorWeHaveAlreadySeen(TransactionData.G-
        etValue(CorrelatorGUID)))
{
    MetricPageCachedInInternet=true;
}
RecordAllMetrics(TransactionData,
    TransactionData.GetValue(CompanyID);
/* Now an HTTP response 204—No Content is returned to
    the browser program. Thus, no bytes other than the head-
    ers (which are required) are returned. Advantages are:
    increased transfer speed, no data file need be cached by
    a browser program, browser program does not attempt to
    display the result (if a 1×1 gif were returned, it could
    conceivably be displayed).
return HTTP_STATUS_CODE_204;
}
```

With respect to timing the display of images, different JavaScript code can be used to time individual images as necessary to generate a transit time report. To accurately time images, the URL component of the <IMG> tag must be replaced with script code, such as JavaScript. Part of the code is used for JavaScript-enabled browser programs (which will generate data), and part is used for browser programs that do not support JavaScript (which will not generate data). Essentially, the original src URL of the <IMG> tag is replaced with a call to a JavaScript function, which marks a Timestamp and then the src is swapped back to the original URL. The <IMG>'s onload event handler is set to point to another JavaScript function, which marks an end Timestamp for the image load. The <IMG>'s onabort and on error handlers are also set to the handler, which marks those cases accordingly. The <body>'s onload on the onerror handler is then set to a function that culls together all the pertinent data and transfers the data to the data center. Thus, this system requires that every <IMG> have a name. An example follows:

```
<script language=JavaScript>
/* These are global JavaScript vars and funcs */
var ImageTimer = new Object;
var ImageData = new Object;
var ImageStatus = new Object;
// mark the starting Timestamp
function LoadImg(name, url)
{
    ImageTimer[name] = new Date( );
    document[name].src = url;
}
// mark the ending Timestamp and status is okay
function ImageOnLoad(name)
{
    if (ImageData[name]) return; // in case function is called twice
    ImageData[name] = (new Date( )) — ImageTimer[name];
    ImageStatus[name] = "ok";
}
// mark the ending Timestamp and status is error
function ImageOnError(name)
{
    ImageData[name] = (new Date( )) — ImageTimer[name];
    ImageStatus[name] = "error";
}
// mark the ending Timestamp and status is aborted
function ImageOnAbort(name)
{
    ImageData[name] = (new Date( )) — ImageTimer[name];
    ImageStatus[name] = "abort";
}
/* cull together data and status on all images, and transfer it to
the portal of the data center. */
function BodyOnLoad( )
{
    var data =
        "http://portal.Datacenter.com/BrowserMonitordata?url=" +
        location.url;
    var img;
    var count = 0;
    // format data as &imgN=status:name:escape(url):loadtime, e.g.
    //
&imgN=abort:logo:http%25//www.Datacenter.com/images/logo.gif:4159
    for (img in ImageData)
    {
        data += "&img" + count + "=" + ImageStatus[img] + ":" + img
+ ":" + escape(document[img].src) + ":" + ImageData[img];
    }
    var txn = new Image;
    txn.src=data;
}
</script>
```

Thus, a standard <IMG> tag like the following:
<img src=http://www.Datacenter.com/images/logo.gif>
would become:
<img name=logo
src="JavaScript:LoadImg('logo,'http://www.Datacenter.
    com/images/logo.gif')"
onload="ImageOnLoad('logo')" onerror="ImageOnError
    ('logo')" onabort="ImageOnAbort('logo')">

Additionally, the Web page's<body> tag needs an onload event handler, which can either be set in the <body> tag or through JavaScript, as follows:
<body onload=BodyOnLoad>
or,
<script language=JavaScript>
onload=BodyOnLoad;
</script>

Also, a performance-based redirection browser monitor can be used to dynamically redirect users to download application data based on the speed of connections to each of a plurality of servers, identified below as: "server1mycdn.com," server2.mycdn.com," and server3.mycdn.com." Exemplary code to do this function follows below. The embedded comments explain the steps of the logic being executed. All of the constants can be hard coded into the JavaScript tags, or can be read from a cookie that the server adjusts dynamically.

```
<html><head>
<script language="JavaScript1.2">
var                 aServers=["server1.mycdn.com",
    "server2.mycdn.com", "server3.mycdn.com"];
// initialize specific server to be a default server; alterna-
    tively, the choice of the default server can be randomized
var sFastestServer="default.mycdn.com";
var bFastestServerKnown=false;
function StartTests( )
{
// Check if the server is known in the cookie stored by
    browser monitor
if (CheckCookie( ))
return;
var oTests=new Object;
for (var index=0; index <aServers.length; ++index)
{
// create a new test image
var test=oTests[aServers[index]]=new Image;
test.onload=EndTest;
// start loading the test image from this server
test.src=location.protocol+"//"+aServers[index]+"/
    test.gif";
}
}
function CheckCookie( )
{
// look for cookie FastestServer=<servername>, identify-
    ing fastest server
var   match=document.cookie.match(/FastestServer=([^\;
    \s]*)/);
if (match && match.length >=2)
{
sFastestServer=match[1];
bFastestServerKnown=true;
return 1;
}
return 0;
}
function EndTest( )
{
// grab the server name from this image's src attribute
var match=this.src.match(/\S+:W([^V]*)/);
// if a server name was found, but the fastest server isn't
    known yet, save it
if   (match   &&   match.length   >=2   &&
    bFastestServerKnown==false)
{
// set the server name
sFastestServer=match[1];
bFastestServerKnown=true;
// save this information in the cookie
document.cookie="FastestServer="+sFastestServer+";
    path=/";
}
}
```

```
// Load an image using the fastest server and the given path
function LoadImage(sImageName, sPath)
{
if (bFastestServerKnown==true)
{
window[sImageName].src=location.protocol+"//"+sFast-
    estServer+sPath;
}
else
{
setTimeout("LoadImage('"+sImageName+"',
    '"+sPath+"')", 100);
}
}
// Kick off the tests
StartTests( );
</script>
</head>
<body>
<P> This page dynamically determines the fastest server in
    a set, and therefore will also automatically fail over if
    one server goes down. In this example, loading is
    delayed until a fastest server can be determined. The
    chosen server is then stored in a cookie so the test does
    not need to be repeated on each page load.
<P> This page can alert user when the fastest server has
    been detected.
<script>
function AlertWhenFastestServerKnown( )
{
if (bFastestServerKnown==true)
{
alert("The fastest server is" +sFastestServer);
}
else
{
setTimeout("AlertWhenFastestServerKnown( )", 500);
}
}
// call the alert function
AlertWhenFastestServerKnown( );
</script>
<P> Here is an image loaded from the fastest server.
<img id="image1" src="JavaScriptloadImage('image1',
    '/images/myBigLogo.gif')">
</body>
</html>
```

Logical Steps Implemented in Determining Several Performance Metrics

An important performance metric that the present invention can determine is the latency for loading an image into an HTML document, such as a Web page. This performance metric thus measures the duration of an interval starting when the image downloading begins and ending when the image has either been completely loaded, or the downloading of the image is aborted by the user, or an error has interrupted the loading of the image.

Figure 4:
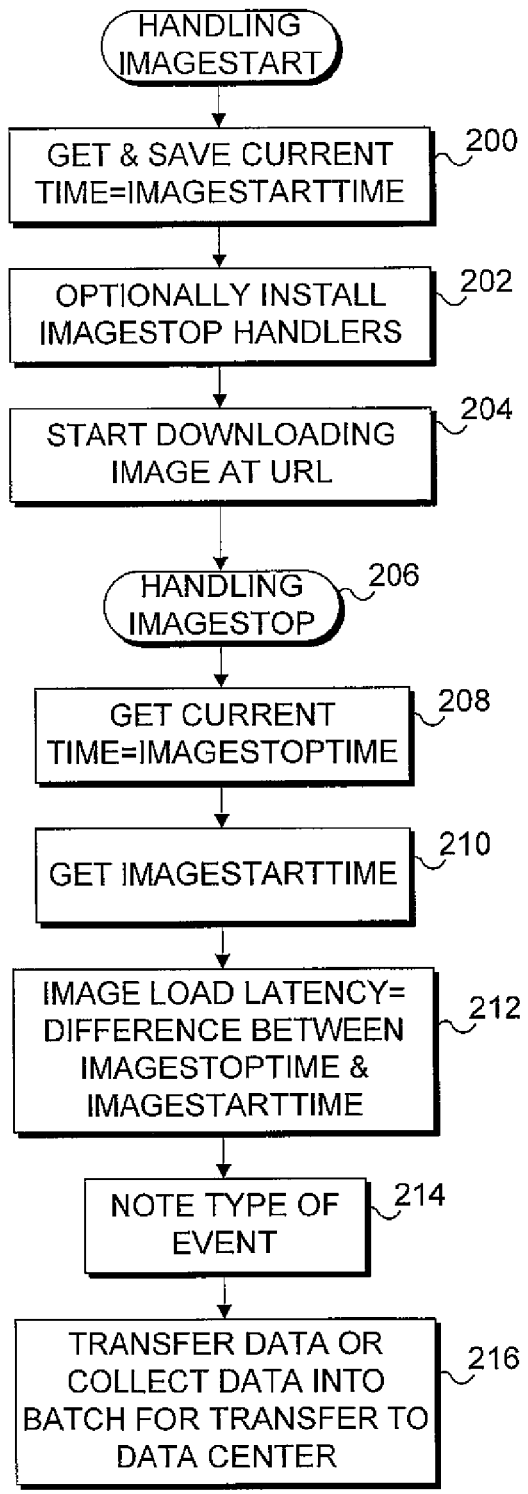
FIG. 4 is a flow chart illustrating logical steps implemented in determining an image load latency.

Images are typically referenced in an HTML document with different protocols such as HTTP or hypertext transport protocol secure (HTTPS), which direct the browser program to download the image identified by the URL. However, in a monitored Web page, an image can be defined using a JavaScript that references a URL, thereby directing the browser program to execute the script instead of immediately downloading the image. This script code queries the current time and saves it as a variable ImageStartTime in accord with a step 200 in FIG. 4. This figure illustrates the steps implemented to determine the image load latency Optionally, ImageStop handlers can be installed in step 202. The script then corrects the browser program to load the image referenced by a conventional HTTP or HTTPS URL, as indicated in a step 204 in FIG. 4.

By installing event handlers for this image, a JavaScript function is called when the image has finished loading, or when the loading has been aborted either by the user or as a result of an error. In either event, a step 206 provides for handling the ImageStop event. In response to detecting this event, the JavaScript queries the current time, which it saves to a variable ImageStopTime as indicated in step 208. Next, the JavaScript gets the value for the variable ImageStartTime in a step 210, and in a step 212, calculates the image load latency as being equal to the difference between ImageStopTime and ImageStartTime.

It should be noted that while most image URLs specify the HTTP or HTTPS protocols used for image monitoring, the present invention is not limited to only these protocols. Instead, other protocols can also be used.

A step 214 also provides for noting the type of event that resulted in the ImageStopTime being determined, since if the user aborted the downloading of the image or it was aborted due to an error, the result obtained for the image load latency performance metric may be disregarded or flagged. Finally, a step 216 provides for transferring the image loading latency performance metric data or alternatively collecting the data into a batch for subsequent later transfer to the data center. This step can be implemented by including the image load latency performance metric along with other metrics in a subsequent request for another Web page that is transmitted to the server from the client. The JavaScript includes a reference to the URL for the data center to which the data that were just determined (or which were previously collected as a batch and are now being transferred) will be submitted. In the event that a browser program does not support JavaScript, it is important that the monitored image be properly displayed, even if an image load latency performance metric is not measured. To accomplish this, as noted above, the entire tag for the image is wrapped in a JavaScript block that uses a specific call to output the tag if JavaScript is supported. Conversely, if JavaScript is not supported, then a tag without any monitoring calls is used.

In addition to determining the image load latency for an image, the present invention can also determine a parse latency corresponding to the interval between the time that the top of the Web page is parsed until the time that the image tag is parsed. Another performance metric that might be determined is queue latency, corresponding to the duration between the time that the image tag is parsed and the time that the image begins downloading. The sum of the parse latency, queue latency, and download latency corresponds to the interval between the time that the browser program starts downloading the HTML for the Web page until the time that the image is complete (either due to success, user abort, or an error in the downloading of the image). Several other options that can be implemented by the present invention include: (a) use of JavaScript language with sufficient visibility into the image object to implement imaging monitoring; (b) application of the image monitoring technique to any object that supports dynamically assigning its source URL, attribute from within a JavaScript URL; and (c) monitoring of JavaScript off-screen images that are created with the "new image ( )" syntax by noting a timestamp before assigning the ImageStop event handlers and source URL.

The code implementing the image performance monitoring function can be written to use external functions if a large number of images will be monitored on a Web page, to minimize the amount of code in the page and to batch the data transfers to minimize the amount of extra network traffic. Conversely, if only a small number of images are to be monitored, it will not be necessary to implement event handlers as external functions or to batch the data transfers for each image.

The present invention is also capable of monitoring the navigation of a user between monitored Web pages, enabling additional types of usage metrics to be determined, and retention of data defining a transaction sequence indicating the steps followed by a user in navigating through a series of Web pages. Specifically, it is possible for the present invention to monitor how a user departed from a Web page, for example, by clicking a hyperlink, submitting a form, or using the back or forward buttons on the browser program. To do so, the invention employs a navigation monitor function. This function is used to identify a referring page obtained from the browser program and any referring page obtained from a cookie. Any existing data relating to a sequence are transmitted to the data center and cleared before starting to monitor another sequence of user navigation steps. The navigation monitor must also either add or intercept existing event handlers related to navigation of the user through Web pages so that the data related to that navigation is maintained for transmission to the data center.

Figure 5:
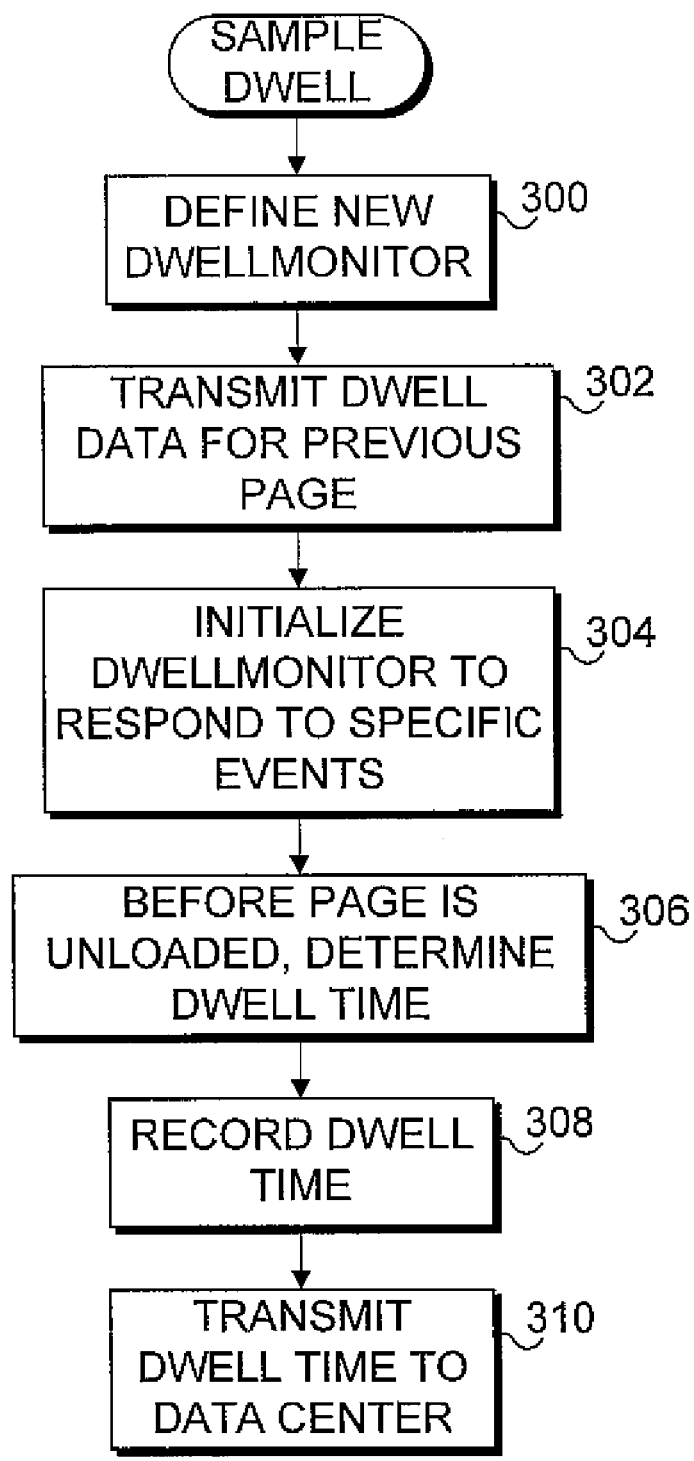
FIG. 5 is a flow chart illustrating logical steps implemented in determining a dwell duration corresponding to the time during which a user visits a specific Web page.

The steps involved in sampling dwell are illustrated in FIG. 5. The objective of dwell sampling is to measure the interval time during which a user visits a specific Web page. Thus, the dwell sampling represents the duration of time between when the Web page was initially rendered and when it was unloaded from the browser program. A step 300 provides for defining a new DwellMonitor class, i.e., for defining certain event handlers, actions, and data. Any dwell data for a previous Web page are transmitted to the data center in a step 302. In a step 304, the DwellMonitor function is initialized to respond to specific events. These events include the loading of the Web page, the unloading of the Web page, the user navigating to different forms on a Web page, and the user clicking on a link to another Web page.

In a step 306, before the current Web page is unloaded, the DwellMonitor function determines the dwell time for the page, corresponding to the time interval between the time that the page was rendered and when it was unloaded. This calculation is made in response to the corresponding events indicative of the time interval. In a step 308, the dwell time is recorded and then subsequently transmitted to the data center in a step 310. The transmission of the dwell time can occur as an attachment to a subsequent request for a new Web page or as independent traffic directed to the URL for the data center. Preferably, the DwellMonitoring function saves the dwell time as a cookie for subsequent transmission.

Figure 6:
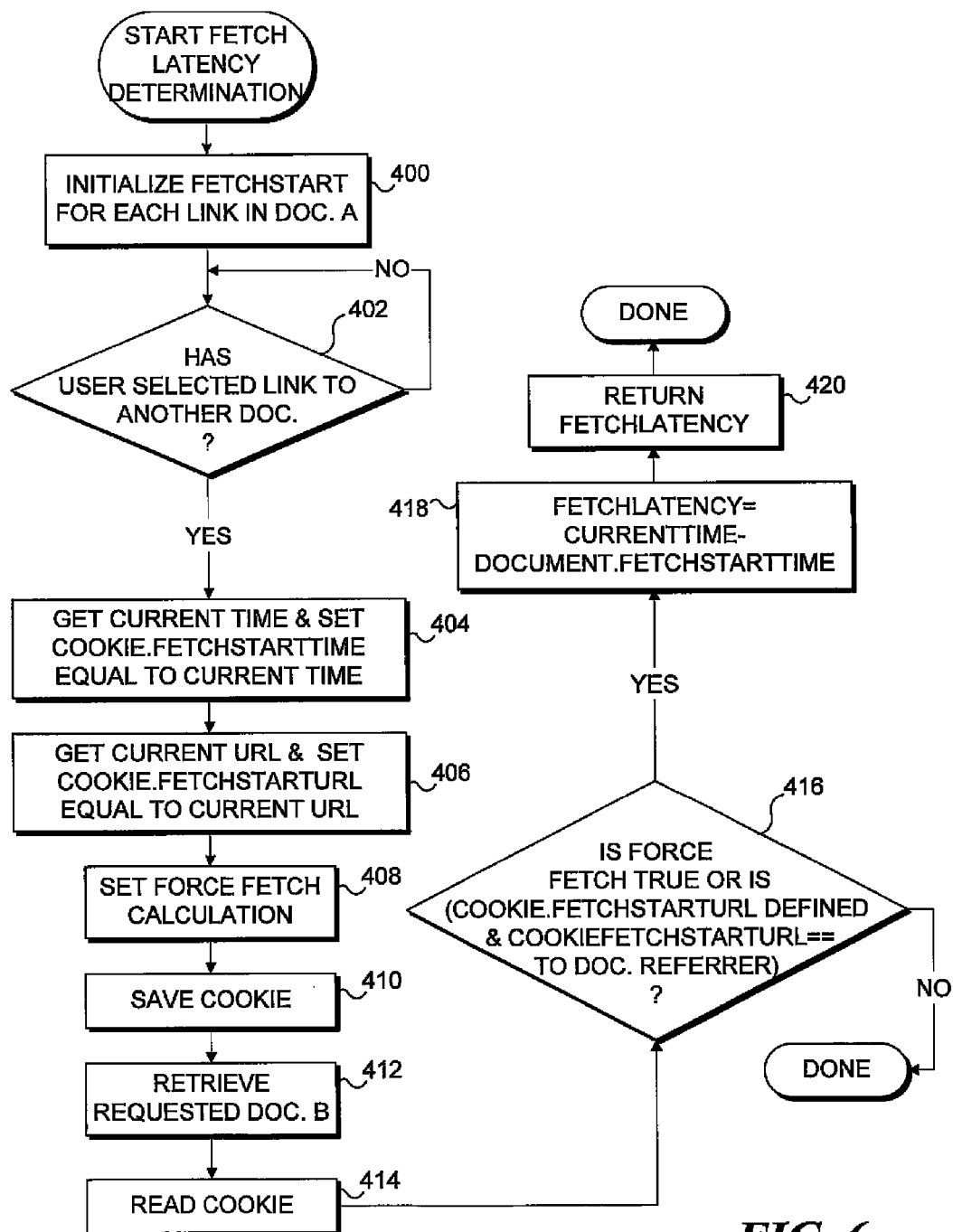
FIG. 6 is a flow chart showing logical steps for determining a fetch latency.

Referring now to FIG. 6, the steps implemented to determine fetch latency are illustrated. Fetch latency is the interval between the time when a navigation event is started (e.g., by clicking a hyperlink, submitting a form, or programmatically changing the location currently being viewed), and the time when the HTML for the new Web page has been downloaded to the browser program and parsed. In step 400, a Fetch Driver is created for carrying out this function. Fetchstart event handlers are initialized for each link in a current document A (the Fetch Driver will end the current fetch in progress, if there is one). The event handlers that are called enable the fetch latency to be calculated in regard to the navigation to the next page, e.g., document B. A decision step 402 determines if the user has selected a link to another document. If not, the logic continues to loop, awaiting the choice of a link to another document. Once the user has chosen a link, a step 404 provides for getting the current time and setting the variable Cookie.FetchStartTime equal to the current time. This variable must be maintained or persist across the navigation from document A to document B to enable this compound performance metric to be determined. In addition, the Fetch Driver also obtains the URL for the current document in step 406, and sets the variable Cookie.FetchStartURL equal to the current document URL. It should be noted that the steps initiated in response to decision step 402 can be triggered either by a click on a link or submission of a form, as well as being called programmatically at any time before a given navigation event such as a reload or redirection occurs.

A step 408 sets a flag to force the fetch calculation. When the flag is set, it tells document B that the fetch latency should be determined even if the FetchStartURL does not match that for B's referring URL. The status of the variables set in steps 404, 406, and 408 is then saved to a cookie in a step 410. Next, in a step 412, document B is retrieved as requested by the link or other mechanism noted above. Once document B has been retrieved, the cookie that was saved in step 410 is read in a step 414. A decision step 416 determines if the flag had been set to force the fetch latency to be determined, or alternatively determines if the variable Cookie.FetchStartURL is defined and also if Cookie.FetchStartURL corresponds to the referrer for the current document. If these conditions are not met, fetch latency cannot be determined and the function terminates. However, if the determination in decision step 416 is true, a step 418 determines the fetch latency as being equal to the difference between the current time and the Document.FetchStartTime variable that was saved in the cookie. The fetch latency is returned as a performance metric in a step 420.

Several points should be noted. First, the FetchStart function can be called programmatically from any place within a Web page that has access to the JavaScript performance metric monitoring function. The value of FetchStart can be provided programmatically for cases in which the referrer field for document B is not defined or contains a different value than is expected for determining fetch latency, for example, when a Web page is obtained by redirection, or by replacing or reloading a page, or as a result of navigation to a frame set where it is desired to determine fetch latencies for the content Web pages within the frame set.

Instead of using a cookie to retain the required information between successive Web pages or documents, another type of browser-maintain state can be used. In addition, the variable Cookie.FetchStartURL can be a representation of the URL instead of a full text of it. Such representations can be generated using a hash or a digest function to transform the URL string.

Figure 7:
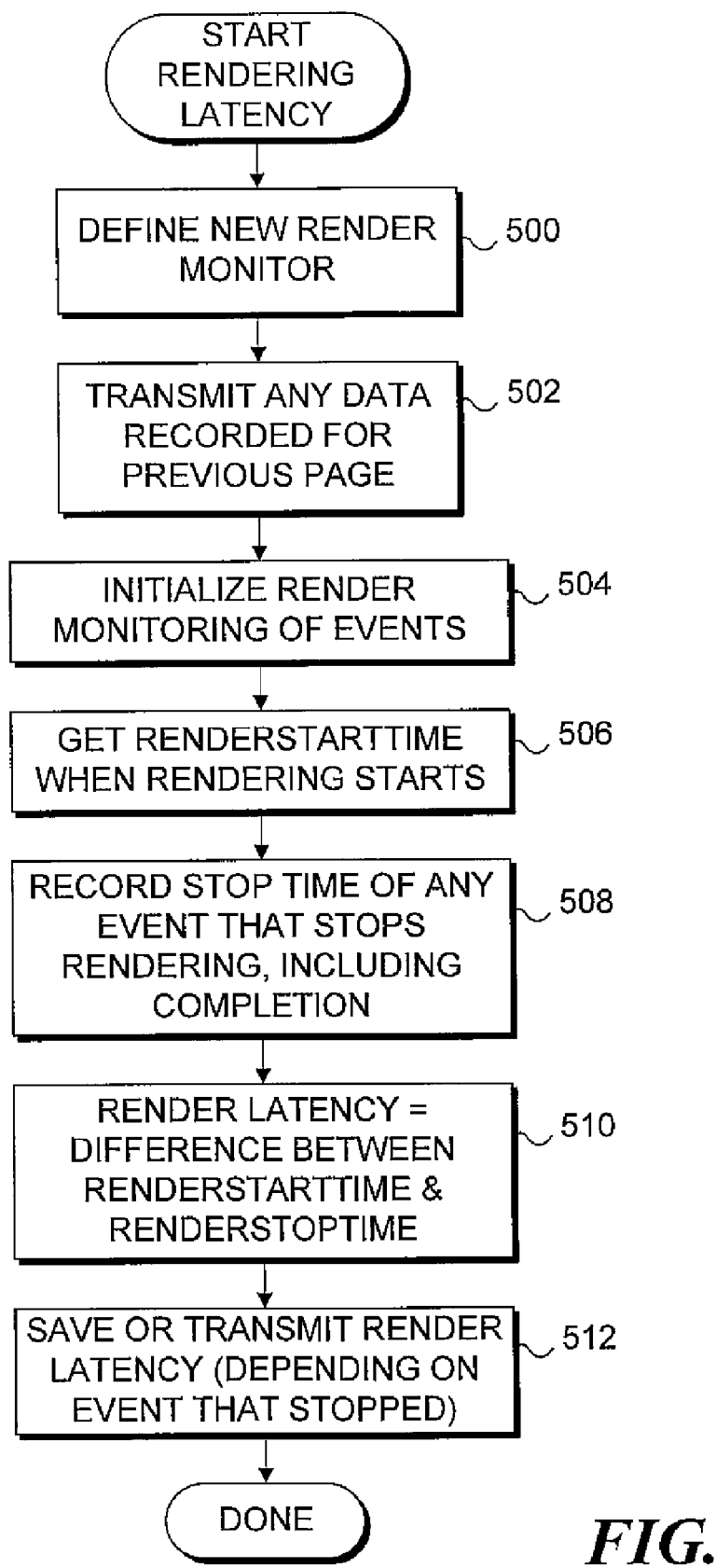
FIG. 7 is a flow chart illustrating logical steps for determining a rendering latency.

FIG. 7 illustrates the logical steps implemented in determining rendering latency. In a step 500, a new render monitoring function is defined, which requires certain event handlers, actions, and data to be defined. A step 502 transmits any data recorded in regard to the rendering latency for a previous Web page to the data center. Next, a step 504 initializes the render monitoring of events for the current Web page. The render monitoring function listens for specific events, including the loading and unloading of a window, a stop event for the window, a submission of a form, and the clicking on a link by the user. In a step 506, the logic gets the RenderStartTime corresponding to the beginning of the time which a client computer begins to download and draw visual elements (including inline images), on the monitor. Next, in a step 508, the logic records the RenderStopTime of any event that causes the rendering to be stopped, including its completion. In addition, if a reason other than the completion of the rendering caused the stop, that reason is also recorded. Finally, in a step 510, the function determines the render latency as being equal to the difference between the RenderStartTime and the RenderStopTime. This performance metric, and/or any reason for stopping the rendering process other than the completion, are transmitted to the data center, depending upon the type of event that stopped the rendering. Clearly, if the user aborted the rendering, or if it was aborted due to an error, the render latency will often indicate an excessive delay. The render latency is transmitted to the data center in step 512.

Figure 8:
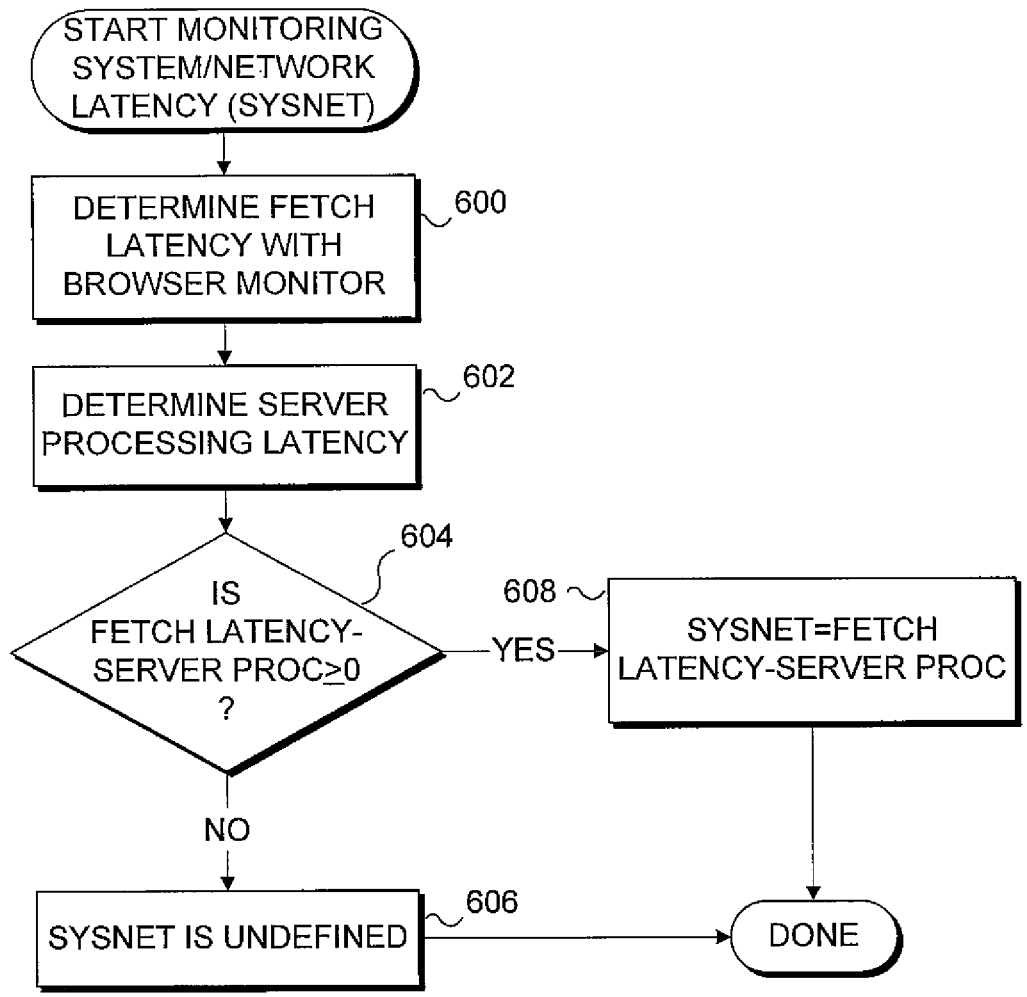
FIG. 8 is a flow chart indicating the logical steps for determining a system/network latency.

By facilitating performance monitoring on distributed application server, proxies, and on the client or other type of recipient, the present invention enables a correlated performance metric to be determined. For example, as shown in FIG. 8, the present invention determines a system/network latency, which is a correlated performance metric for a distributed application on a network. To make this determination, a fetch latency must be determined on a browser monitor and in addition, a server processing latency must be determined for the server using a server monitor. The fetch latency was described above. The server processing latency corresponds to the interval between the time when the server starts processing a Web request received from a client and the time that the server has completed the request. As shown in a step 600 in FIG. 8, the browser monitor determines the fetch latency. Further, as noted above, this performance metric is preferably transmitted to the data center. In a step 602, the server monitor determines the server processing latency. In addition, although not shown herein, that latency is also transmitted to the data center, or alternatively, the system/network latency can be determined on the server and the correlated performance metric then transmitted to the data center.

A decision step 604 determines if the difference between the fetch latency and the server processing latency is greater than or equal to zero. If not, the system network latency is undefined, as indicated in a step 606 and the determination of this correlated performance metric is terminated. However, if the result from decision step 604 is affirmative, a step 608 provides for determining the system/network latency as being equal to the difference between the fetch latency and the server processing latency.

Further alternatives associated with determining the system/network latency include enabling the browser monitor to determine it by providing the server processing latency to the browser monitor through means such as a cookie, or as data in an HTML page that is requested by the browser monitor, or as data in inline or sourced JavaScript. Once the browser monitor has received the server processing latency, it can compute the system and network latency itself, or can simply transfer both the fetch latency and server processing latency to the data center, where the system/network latency will be determined. However, if the server monitor and browser monitor separately transfer the server processing latency and the fetch latency, respectively, to the data center, both of these performance metrics should be marked with the same transaction identifier. A transaction identifier may be implemented as a globally unique identifier or as any other sufficiently specific identifier that can be used to correlate the two performance metrics. The data center will then use the identifier to associate the two performance metrics as being related to the same transaction, enabling the system/network latency to be determined.

It should be noted that a number of other server performance metrics can also be determined that are not necessarily correlated with the performance metrics determined on the browser monitor.

Alternative Embodiments

In an alternative embodiment of the present invention, the collection of compound metrics is implemented without use of a server monitor. In this case, the browser monitor software uses information stored in the HTML annotations, and does not rely on a cookie for information transferred from the server. This embodiment does not support correlated metrics, since presumably no server monitor is present. However, it supports the other benefits of the invention, including compound metrics and extended environmental metrics.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for determining one or more performance metrics for a distributed application in which distributed application data is transferred from a first site to a second site over a network, at least a portion of the method being performed by a computing device comprising at least one processor, the method comprising:
   receiving a request for the distributed application data, the request being transmitted from the second site to the first site over the network, the time of the request being recorded at the second site using machine instructions;
   in response to the request, transmitting the distributed application data from the first site to the second site over the network;
   including machine instructions with the distributed application data that define a performance monitoring function;
   including a monitor cookie with the distributed application data that indicates that the distributed application data is a monitored object, wherein the monitor cookie enables the second site to:
      detect that the distributed application data is a monitored object;
      execute, in response to detecting that the distributed application data is a monitored object, the machine instructions to implement the performance monitoring function to determine the one or more performance metrics for the distributed application without requesting any additional distributed application data from any other site, at least one of the one or more performance metrics being determined using the recorded time of the request.

2. The method of claim 1, wherein the machine instructions included with the distributed application data implement the performance monitoring function at the second site after the distributed application data is accessed at the second site.

3. The method of claim 1, further comprising collecting the one or more performance metrics for the distributed application over the network.

4. The method of claim 3, wherein collecting the performance metrics includes applying a probabilistic sampling parameter to determine whether performance metrics are collected from each of a plurality of sites.

5. The method of claim 3, further comprising determining whether to collect a performance metric from the second site as a function of a specific performance metric that was determined at the second site.

6. The method of claim 1, wherein the performance monitoring function is configured to cause the second site to determine one or more of:
   (a) a fetch latency, corresponding to a time period required to fetch the distributed application data from the first site over the network;
   (b) a render latency, corresponding to a time period required to fetch and display the distributed application data at the second site;
   (c) a dwell latency, corresponding to a time period exhibited by a user requesting the distributed application data, before requesting other distributed application data;
   (d) a per-image fetch latency, corresponding to a time period for fetching a specific image referenced in the distributed application data;
   (e) an image arrival time, corresponding to a time at which a specific image, loaded as a part of accessing the distribution application data, arrives at the second site;
   (f) a navigation status, corresponding to an event that brought a user to the distributed application data;
   (g) a cache status, corresponding to a determination of whether the distributed application data was cached at the second site;
   (h) a window resize event, corresponding to a determination of whether the user resized a window in which the distributed application data is accessed;
   (i) a page stop event, corresponding to a determination of whether the user aborted loading the distributed application data;
   (j) an image error event, corresponding to a determination of whether an error occurred while loading an image referenced in the distributed application data; and
   (k) a JavaScript error event, corresponding to a determination of whether an error occurred during interpretation of JavaScript included in the distributed application data.

7. The method of claim 1, further comprising:
   determining a performance metric at the first site; and
   combining a performance metric determined at the second site with the performance metric determined at the first site to determine a correlated performance metric.

8. The method of claim 1, wherein the one or more performance metrics are determined without any apparent effect on the access of the distributed application data at the second site.

9. A non-transitory memory medium on which are stored machine readable instructions that, when executed by a client computing device, cause the client computing device to:
   record the time of a request by the client computing device for distributed application data from another computing device;
   receive the distributed application data from another computing device;
   detect a monitor cookie included with the distributed application data received from the other computing device, the monitor cookie indicating that the distributed application data is a monitored object;
   determine, in response to detecting the monitor cookie, at least one performance metric for the distributed application data on the client computing device, the performance metric being related to access of the distributed application data by a browser program executed on the client computing device and enabling at least one of a compound performance metric and a correlated performance metric to be determined without requesting any additional distributed application data from any other site.

10. The memory medium of claim 9, wherein the machine readable instructions cause the performance metric to be transmitted to a remote site over a network for determination of the correlated performance metric.

11. The memory medium of claim 9, wherein the performance metric is determined without the client device providing any indication to a user of the client device that the performance metric is being determined.

12. The memory medium of claim 9, wherein the machine readable instructions determine one or more of the following performance metrics:
   (a) a fetch latency, corresponding to a time period required to fetch a base Web page document from a server over the network;
   (b) a render latency, corresponding to a time period required to fetch and display all contents referenced within an HTML document on the client device;
   (c) a dwell latency, corresponding to a time period exhibited by the user viewing the Web page, before navigating to a different Web page with the browser program;
   (d) a per-image fetch latency, corresponding to a time period for fetching a specific image referenced in the Web page;
   (e) an image arrival time, corresponding to a time at which a specific image, loaded as a part of rendering the Web page, arrives on the browser;
   (f) a navigation status, corresponding to an event that brought the user to the Web page;
   (g) a cache status, corresponding to a determination of whether the Web page was cached by the browser program or by a proxy;
   (h) a window resize event, corresponding to a determination of whether the user resized a window in which the Web page is rendered;
   (i) a page stop event, corresponding to a determination of whether the user aborted loading of the Web page;
   (j) an image error event, corresponding to a determination of whether an error occurred while loading an image included in the Web page; and
   (k) a JavaScript error event, corresponding to a determination of whether an error occurred during interpretation of JavaScript included in the Web page.

13. The memory medium of claim 9, wherein the machine readable instructions cause the client computing device to determine whether the distributed application data was previously cached by the client computing device.

14. The memory medium of claim 9, wherein the performance metric includes a performance metric for each image in a Web page.

15. A system for determining and collecting at least one performance metric related to access of a Web page by a browser program, comprising:
   (a) a memory;
   (b) a network interface; and
   (c) a processing device that is coupled to the memory and the network interface, the network interface being coupled to a remote storage at a server to retrieve the Web page, the Web page including machine instructions that cause the processing device to:
      detect a monitor cookie included with the Web page, the monitor cookie indicating that the Web page is a monitored document;
      perform, in response to detecting the monitor cookie, a browser monitoring function when the Web page is loaded by the processing device, the browser monitoring function determining the at least one performance metric and being implemented without requiring any affirmative action by a user of the processing device and without using the browser monitoring function to request any further download from any site, the at least one performance metric being combined with another performance metric determined at the server to determine a correlated performance metric.

16. The system of claim 15, wherein the machine instructions further cause the processing device to transmit the performance metric from the processing device to a remote site over a network through the network interface.

17. The system of claim 15, wherein a determination of whether the performance metric will be accepted for processing by a data center is based upon a probabilistic sampling parameter, ensuring that performance metrics transmitted to the data center are randomly sampled.

18. The system of claim 15, wherein the machine instructions further cause the processing device to determine if the Web page was previously cached in the memory by the processing device before determining the performance metric.

19. The system of claim 15, wherein:
 (a) the server executes a server monitoring function in regard to transferring the Web page to the processing device over the network;
 (b) the server determines a server performance metric related to the transfer of the Web page to the processing device from the server computing device; and
 (c) the server transmits the server performance metric to a data center for processing.

20. The system of claim 19, wherein the data center combines a performance metric determined by the browser monitoring function executed by the processing device with the server performance metric determined by the server computing function to determine the correlated performance metric.

* * * * *